(No Model.)

W. N. MORRELL & C. A. EDDY.
FRONT GEAR FOR VEHICLES.

No. 466,252. Patented Dec. 29, 1891.

WITNESSES:
F. P. Crobaugh
G. M. Knight

INVENTORS.
William N. Morrell
and Charles A. Eddy
BY F. F. Warner
their ATTORNEY.

UNITED STATES PATENT OFFICE.

WILLIAM N. MORRELL AND CHARLES A. EDDY, OF WATERLOO, ASSIGNORS TO THE GENEVA CARRIAGE COMPANY, OF GENEVA, NEW YORK.

FRONT GEAR FOR VEHICLES.

SPECIFICATION forming part of Letters Patent No. 466,252, dated December 29, 1891.

Application filed September 22, 1891. Serial No. 406,484. (No model.)

*To all whom it may concern:*

Be it known that we, WILLIAM N. MORRELL and CHARLES A. EDDY, citizens of the United States, and residents of Waterloo, in the county of Seneca and State of New York, have invented certain new and useful Improvements in the Fore-Carriage or Front Gear for Vehicles, of which the following is a specification.

Our invention relates to the front portion of the gear of wheeled vehicles, such as wagons and carriages of various classes, and especially to the springs heretofore employed therein and arranged between elliptic springs applied to the forward axle.

It also especially relates to the fifth-wheel and to certain subordinate or minor features of construction and arrangement of parts, all of which we will hereinafter set forth in our several claims and more fully describe in connection with the accompanying drawings, in which—

Figure 1:
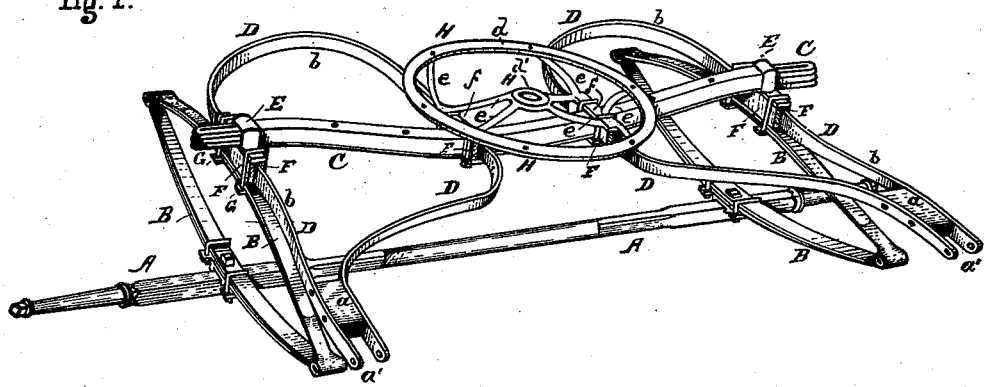
Figure 2:
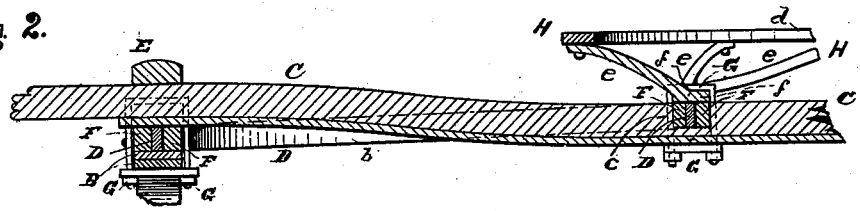

Figure 1 is a perspective representation of a front gear of the class referred to and embodying our improvements, and Fig. 2 is a vertical central section taken longitudinally through the bed or cross-bar and also extending through the parts shown in connection therewith.

Like letters of reference indicate like parts.

A is the forward wheel-axle, and B B are elliptic springs secured thereto in any well-known or suitable way. C is the cross-bar or bed-piece. These parts have heretofore been connected to each other, and therefore we do not here intend to claim the same, broadly.

D D are flat continuous springs arranged, respectively, one edge above the other widthwise and horizontally lengthwise. The forward ends of these springs are applied to blocks $a\ a$ and project somewhat forward of them, as shown at $a'\ a'$, Fig. 1, to constitute ears or lugs for connection with the thills or to serve as supports for a splinter-bar or like cross-piece when a pole is used instead of thills. The outer portions $b\ b$ of these springs pass from the blocks $a\ a$ rearward and underneath the bed or bar C, to which they are there applied by means of the wheel-iron heads or stays E E, side blocks F F, and clips G G, the irons or cross-pieces of which latter pass underneath the central portions of the upper bows of the springs B B, thus clamping all these parts firmly together near the ends of the bar or bed C, as shown. It will be observed on reference to the drawings that the springs D D pass between the blocks F F, respectively. From the bar or bed C the springs D D extend rearwardly and inwardly in bow form, as shown at $b\ b$, and when these bows again meet the bed or bar C they are clipped thereto (with the exceptions hereinafter mentioned) in the manner already described. From the clips last referred to the springs D D extend forward and laterally in bent form to the blocks $a\ a$, all of which is clearly shown in Fig. 1. It will be perceived that a considerable portion of the central part of the bar or bed C is between the clips last referred to.

We also desire here to state that we deem it preferable to cut or gain the upper side of the bar or bed C sufficiently to receive the blocks F F where the springs D D are applied to the inner or central portion of the bar or bed C, as shown at $c$, Fig. 2.

We have referred to the parts D D as springs; but it is not absolutely essential, but only preferable, that they should be flexible. We make these parts of flat or sheet metal strips—steel by preference—principally to facilitate construction and avoid unnecessary expense.

H is the "fifth-wheel." This wheel consists of an outer rim or circle $d$ and an inner circle or open central part $d'$, and these circles are connected to each other by means of arms $e\ e$, constituting a web, four of which arms in the example shown support the central portion and six of which support the outer circle, being arranged equidistant from each other at their junction therewith. Each pair of arms extending from the central circle is connected at its outer ends by means of horizontal bars or bed-irons $f\ f$. We make the web now described in one piece of cast metal. The inner and outer circles are in the same horizontal plane, but the bars $f\ f$ are considerably below that plane, as shown, and the central opening or circle (which is intended to receive the king-bolt) is thus supported a corresponding distance above the bed or bar C. This latter feature of construction is one of the features of our invention, for we intend in practice to pass the king-bolt only through the central opening of the fifth-wheel and not through the bed or bar C. To secure the fifth-wheel in place, we pass the U-bolts of the clips over the bars $f\,f$, which in this respect serve somewhat the same purpose as do the lateral extensions of the irons or stays E E.

By making the parts D D of spring metal bent and arranged substantially as shown their forward portions serve to relieve the thills or pole to some extent from any severe or sudden lateral jar or movement of the vehicle.

Those inward parts of the springs D D which project in front of the bar or bed C have heretofore been termed the "futchells" and the other parts the "wheel-iron" or "wheel-iron stay," and we do not therefore here intend to claim the same, broadly. These parts, however, have not to our knowledge been before made in one continuous piece of flat or sheet metal arranged and applied as shown and described. Neither has the fifth-wheel, which, broadly considered, is old and well known, been made and applied in the manner now explained. These novel features, as set forth in our claims, constitute our invention, our purpose being, chiefly, to facilitate the construction of gears containing these parts, to render them cheaper, and to improve their action. We avoid much of the blacksmithing heretofore required. We desire to state, further, that we would regard a futchell and wheel-iron stay made in one continuous piece, though somewhat oval or in other form in cross-section, as within the scope of our invention.

Having thus described our invention, what we claim as new, and desire to secure by Letters Patent, is—

1. The combination, in the fore-carriage or front gear of wheeled vehicles, of the axle, the springs B B, the bed or bar C, the irons D D, each made in one continuous piece of iron or metal bent substantially as described, the head-irons or stays E E, the side blocks F F, and the clips G G, all arranged together, substantially as specified, and for the purposes set forth.

2. The combination, with the bed or cross-bar of the fore-carriage or front gear for wheeled vehicles, of a fifth-wheel having a raised open center and clamped or clipped to the said bar between the said center and the outer circle or rim of the said wheel, substantially as and for the purposes specified.

3. The combination, with the bed or cross-bar of a fore-carriage or front gear for wheeled vehicles, of a fifth-wheel having a raised open center connected to an outer circle or rim in the same plane by means consisting in part of the bars or bed-irons $f\,f$, clipped or clamped to the said bed or bar, substantially as and for the purposes specified.

4. The combination, in the fore-carriage or front gear for wheeled vehicles, of the bed or cross-bar, the irons D D, and a fifth-wheel, all clamped together by means of the same clips or clamps, substantially as and for the purposes specified.

5. The combination, in a fore-carriage or front gear for wheeled vehicles, of the bed or cross-bar, the irons D D, and a fifth-wheel having a raised open center, all clamped together by means of the same clips or clamps, substantially as and for the purposes specified.

Signed at Waterloo, in the county of Seneca and State of New York, this 17th day of September, A. D. 1891.

WILLIAM N. MORRELL.
CHARLES A. EDDY.

Witnesses:
F. P. CROBAUGH,
HENRY C. SWEET.